(12) United States Patent
Muders et al.

(10) Patent No.: US 7,384,209 B2
(45) Date of Patent: Jun. 10, 2008

(54) BALL-AND-SOCKET JOINT CONNECTION

(75) Inventors: Paul Muders, Rhens (DE); Frank Born, Dienethal (DE); Wilhelm Schwab, Neuwied (DE); Andre Stein, Goar-Werlau (DE); Rolf Mintgen, Thür (DE)

(73) Assignee: Stabilus GmbH, Koblenz (DE)

( * ) Notice: Subject to any disclaimer, the term of this patent is extended or adjusted under 35 U.S.C. 154(b) by 167 days.

(21) Appl. No.: 10/842,784

(22) Filed: May 11, 2004

(65) Prior Publication Data

US 2005/0013658 A1   Jan. 20, 2005

(30) Foreign Application Priority Data

May 16, 2003   (DE) ................. 103 22 265

(51) Int. Cl.
*F16C 11/06* (2006.01)

(52) U.S. Cl. .............. 403/115; 403/56; 403/131; 403/157; 248/288.31

(58) Field of Classification Search ........... 403/56, 403/114, 115, 122, 131, 157, 393, 128; 248/288.31, 248/288.51, 481, 482
See application file for complete search history.

(56) References Cited

U.S. PATENT DOCUMENTS

| | | | | |
|---|---|---|---|---|
| 2,229,194 A | * | 1/1941 | Sklarek | 403/110 |
| 2,723,571 A | * | 11/1955 | Koenig | 403/114 |
| 3,375,044 A | * | 3/1968 | Peterson | 403/90 |
| 3,409,317 A | * | 11/1968 | Richards | 403/131 |
| 3,833,309 A | * | 9/1974 | Hobbs | 403/122 |
| 4,068,721 A | * | 1/1978 | Trayler | 403/114 |
| 4,131,957 A | | 1/1979 | Bokros | |
| 4,693,135 A | * | 9/1987 | LaRocca et al. | 74/473.21 |
| 4,805,615 A | * | 2/1989 | Carol | 403/131 |
| 4,967,318 A | | 10/1990 | Ewert et al. | |
| 4,986,503 A | * | 1/1991 | Kabat | 248/288.51 |
| 5,035,464 A | * | 7/1991 | Spallholtz | 403/115 |
| 5,085,388 A | * | 2/1992 | Creutz | 403/115 |
| 5,147,386 A | * | 9/1992 | Carignan et al. | 623/21.16 |
| 5,374,024 A | | 12/1994 | Williams | |
| 5,409,320 A | | 4/1995 | Maury et al. | |
| 5,596,789 A | * | 1/1997 | Simioni | 403/122 |

(Continued)

FOREIGN PATENT DOCUMENTS

DE   199 04 031   8/2000

(Continued)

*Primary Examiner*—Daniel P. Stodola
*Assistant Examiner*—Ernesto Garcia
(74) *Attorney, Agent, or Firm*—Cohen Pontani Lieberman & Pavane LLP

(57) ABSTRACT

A ball-and-socket joint connection has a retaining part which has a fastening point for fixedly mounting the retaining part to a structure, and a rod part which is arranged pivotably in a pivoting-angle region in a pivoting plane via a ball-and-socket joint on the retaining part. The fastening point and the ball-and-socket joint are situated approximately in the pivoting plane and the rod part protrudes from the ball-like component out of a journal slot which extends radially to the ball seat in a sector-like or sectional manner at least corresponding to the pivoting angle and has a width at least corresponding to the thickness of the rod part to reduce a bending moment and loading on the retaining part.

8 Claims, 7 Drawing Sheets

U.S. PATENT DOCUMENTS

| | | | |
|---|---|---|---|
| 5,609,433 A | * | 3/1997 | Pazdirek et al. ............. 403/122 |
| 5,746,548 A | * | 5/1998 | Crandall ..................... 403/122 |
| 5,833,383 A | | 11/1998 | Bauman |
| 5,931,597 A | | 8/1999 | Urbach |
| 6,190,080 B1 | | 2/2001 | Lee |
| 6,206,604 B1 | * | 3/2001 | Dembowsky et al. ....... 403/122 |
| 6,228,120 B1 | * | 5/2001 | Leonard et al. |
| 6,382,865 B1 | | 5/2002 | Paxman |
| 6,824,300 B2 | * | 11/2004 | Drews et al. |

FOREIGN PATENT DOCUMENTS

| | | | |
|---|---|---|---|
| DE | 10029737 A1 | * | 5/2003 |
| FR | 2398214 A | * | 3/1979 |

* cited by examiner

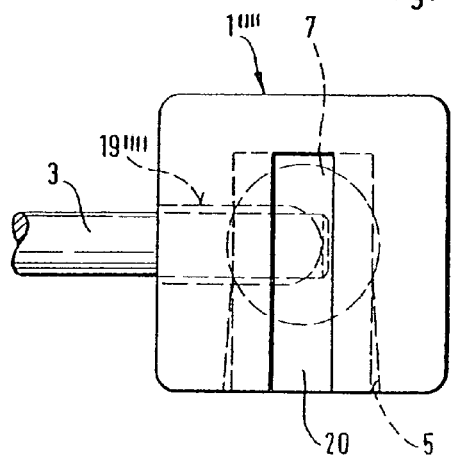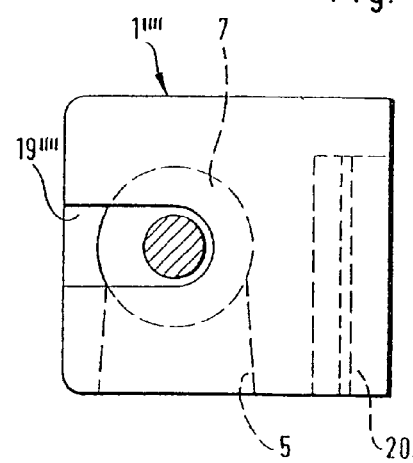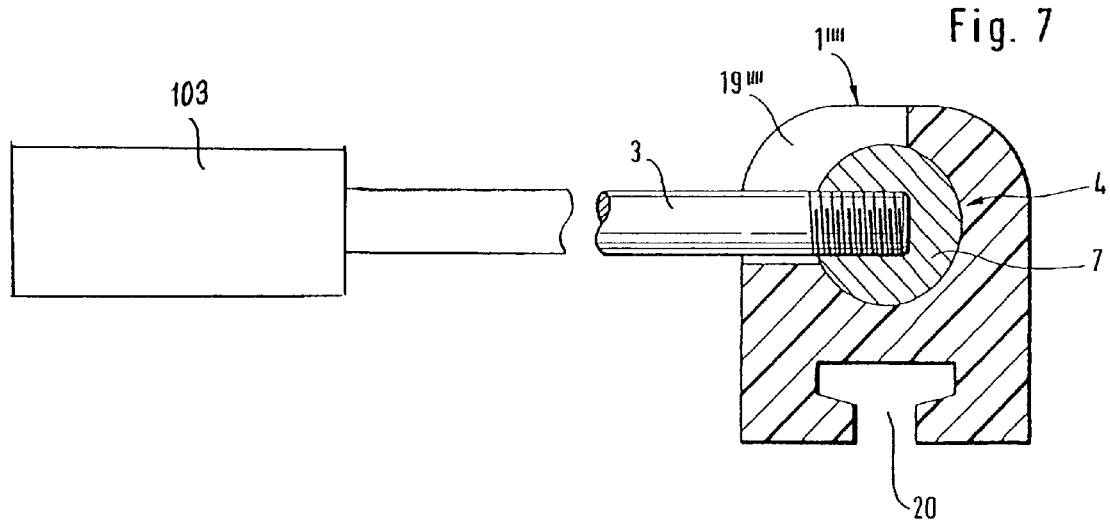

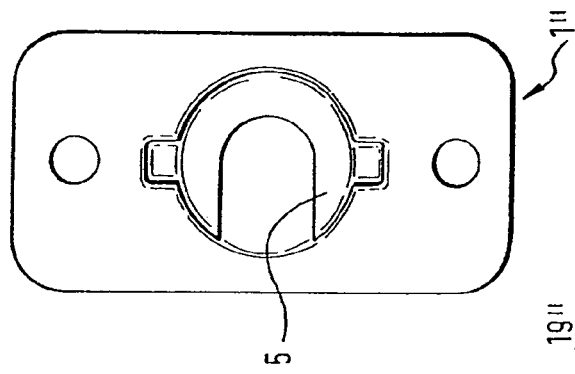
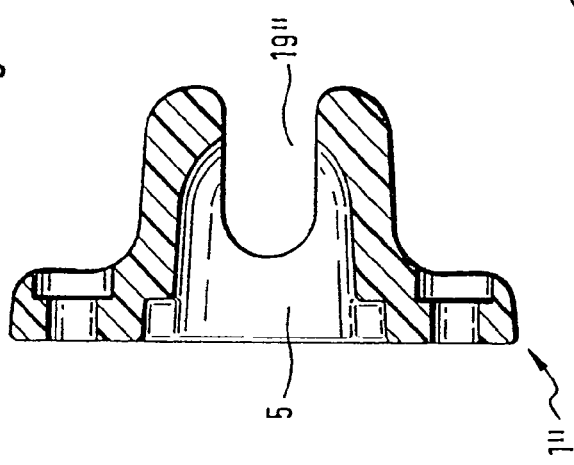
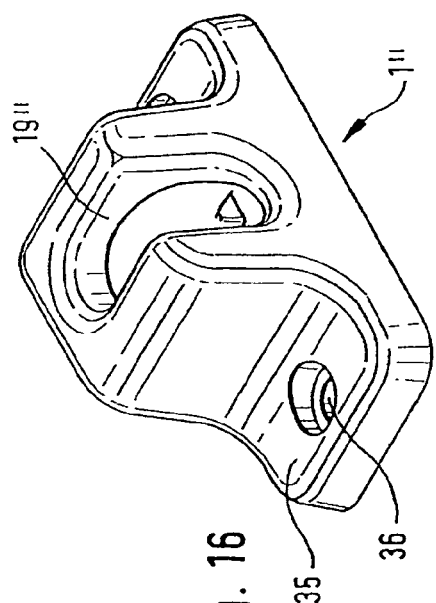
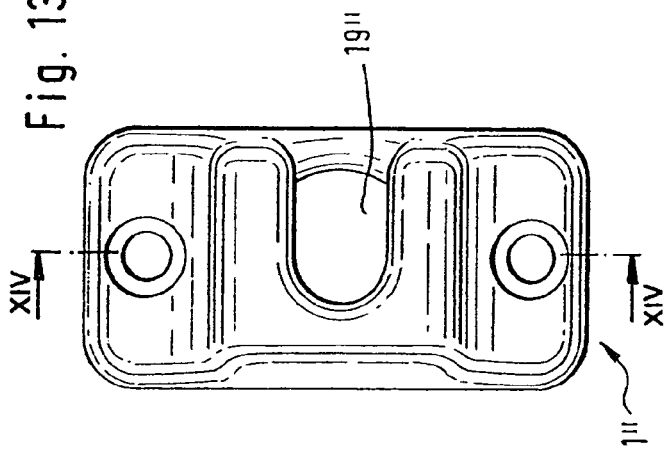

BALL-AND-SOCKET JOINT CONNECTION

PRIORITY CLAIM

This application claims priority under 35 U.S.C. §119 to German Application DE 103 22 265.0 filed May 16, 2003

FIELD OF THE INVENTION

The invention is concerned with a ball-and-socket joint connection, in particular for a piston/cylinder assembly, having a retaining part which has a fastening point for fixedly arranging it, and a rod part which is arranged pivotably in a pivoting-angle region in a pivoting plane via a ball-and-socket joint on the retaining part, the ball-and-socket joint having a ball socket with a spherical-cap-shaped recess of the ball socket, which recess serves as a ball seat and has a radially directed spherical-cap opening through which a ball-like component can be introduced into the ball seat and can be mounted moveably in the ball socket, the said component being gripped from behind by a bearing shoulder of the ball socket.

BACKGROUND OF THE INVENTION

In the case of ball-and-socket joint connections of this type, it is known to align the fastening point for fixedly arranging the retaining part transversely to the pivoting plane of the rod part. As a result, the force flux of the ball-and-socket joint connection results in bending moments on the fastening point and on the component on which the retaining part is to be fixedly arranged. This necessitates an expensive and solid construction of this component, in particular a body panel of a motor vehicle.

SUMMARY OF THE INVENTION

Therefore the invention may provide a ball-and-socket joint connection which permits a simple construction and a low loading of the retaining part and also of the component on which the retaining part is to be fixedly arranged.

This may be achieved according to the invention in that the fastening point and the ball-and-socket joint are situated approximately in the pivoting plane and the rod part protrudes from the ball-like component out of a journal slot which extends radially to the ball seat in a sector-like manner, i.e., a section of the retaining part is cut out to form the journal slot, at least corresponding to the pivoting angle and has a width corresponding at least to the thickness of the rod part.

The force flux of the force to be transmitted by the ball-and-socket joint connection is therefore directed largely towards the pivoting plane, so that at the fastening point essentially just a tensile or compressive force, but not a force producing a bending moment, has to be absorbed by the retaining part and the component on which the retaining part is fixedly arranged. This permits a lightweight design of these parts.

A spherical-cap opening required for installing the ball-like component can extend at an angle to the pivoting plane of the rod part or towards the pivoting plane of the rod part. In other words, the spherical-cap opening extends non-parallel and non-coplanar to the pivoting plane of the rod part.

One design possibility is for the ball socket to be arranged on the retaining part.

In this case, in a simple construction, the ball-like component can be a ball which has a ball journal, in particular a piston rod, which forms the rod part, extends radially and is guided from the ball through the journal slot of the retaining part, which extends at an angle to the spherical-cap opening.

Since the spherical-cap opening is not situated in the force-flux direction, the ball is supported securely in the ball socket when subjected to a tensile or compressive load.

In this case, the journal slot preferably extends at an angle of approximately 90° to the spherical-cap opening.

In another, likewise simply constructed design, the ball-like component can be a ball which has a ball journal, in particular a piston rod, which forms the rod part, extends radially and is guided from the ball through the journal slot of the retaining part, the spherical-cap opening lying approximately diametrically opposite the journal slot with respect to the ball seat and being closable by a spherical-cap base on which the ball-like component can be supported.

In this case, the spherical-cap base may be a separately inserted component or else may be formed by the component on which the retaining part is to be fixedly arranged.

In this case too, the ball is securely supported when subjected to a tensile or compressive load.

For simple production, the ball and ball journal may be produced separately, the ball being provided with a radially directed threaded hole in which the ball journal, which is provided at its one end with a corresponding thread, is screwed.

The production process in this case is particularly simple if the thread of the threaded hole is a self-forming thread which is produced by screwing the thread of the ball journal into a hole of the ball.

To rotationally secure it while the ball journal is being screwed into the ball, the ball can have a recess which opens radially outwards and extends approximately coaxially to the spherical-cap opening, it being possible for a retaining tool to be introduced through the spherical-cap opening into the recess.

If the journal slot extends in an end region opening outwards approximately axially to the spherical-cap opening, then the ball together with the rod part already situated on it can be fitted in a simple manner.

In a further, likewise simply constructed design, the ball socket can be arranged on the rod part, the ball socket preferably being arranged on a ball-socket holder which is arranged axially, in particular coaxially, on one end of the rod part.

In this case, in a simple design, the ball-socket holder is connected to the rod part by means of a screw connection, that end of the rod part which is provided with a thread being screwed into a threaded hole of the ball-socket holder.

In order to be able to arrange the ball-like component on the retaining part in a simple manner, the ball-like component can have a ball section which can be introduced through the spherical-cap opening into the ball socket and can be arranged on the retaining part by means of one or more retaining elements.

To fasten the ball-like component on the retaining part, in one design the retaining part can be an axle which extends approximately transversely to the pivoting plane and is fastened at one or both ends to the retaining part.

In another design, the end or the ends of the axle can be formed integrally with the ball section.

The axle is connected to the ball section in a simple manner by the axle being an axle journal which protrudes through a corresponding hole of the ball section.

For simple insertion of the ball-like component into the ball socket and subsequent securing therein, the ball socket has a locking cage which is inserted into a recess of the retaining part, the rod part or the ball-socket holder.

In this case, the insertion of the spherical component can be carried out in a particularly simple manner if the locking cage has retaining arms which protrude away freely from the ball socket, are arranged in the manner of a circle and are radially moveable and also extend in the direction of extent of the spherical-cap opening and form the spherical-cap opening between them.

In order to simply secure the locking cage in the recess of the retaining part, the locking cage can have, at one or both ends, radially outwardly directed catches which, with the locking cage inserted into the recess of the retaining part, the rod part or the ball-socket holder, grip behind the mouth region or the mouth regions of the opening.

A fixed arrangement of the retaining part on the retaining component can be achieved by the fastening point being formed by one or more recesses, in particular by elongated holes or by a clamping-wedge connection.

Exemplary embodiments of the invention are illustrated in the drawing and are explained in greater detail below. In the drawing Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 5 shows a view of a third exemplary embodiment of a ball-and-socket joint connection of the present invention.

FIG. 6 shows a side view of the ball-and-socket joint connection according to FIG. 5 of the present invention.

FIG. 7 shows a cross section of a plan view of the ball-and-socket joint connection according to FIG. 5 of the present invention. FIG. 7 also shows that the piston rod 3 is a piston rod of a piston/cylinder unit 103.

FIG. 13 shows a view of a retaining part of the ball-and-socket joint connection according to FIG. 12 of the present invention.

FIG. 14 shows a cross section of the retaining part along line XVIII-XVIII in FIG. 13 of the present invention.

FIG. 15 shows a rear view of the retaining part according to FIG. 13 of the present invention.

FIG. 16 shows a perspective view of the retaining part according to FIG. 13 of the present invention.

DETAILED DESCRIPTION OF THE PRESENTLY PREFERRED EMBODIMENTS

Figure 1:
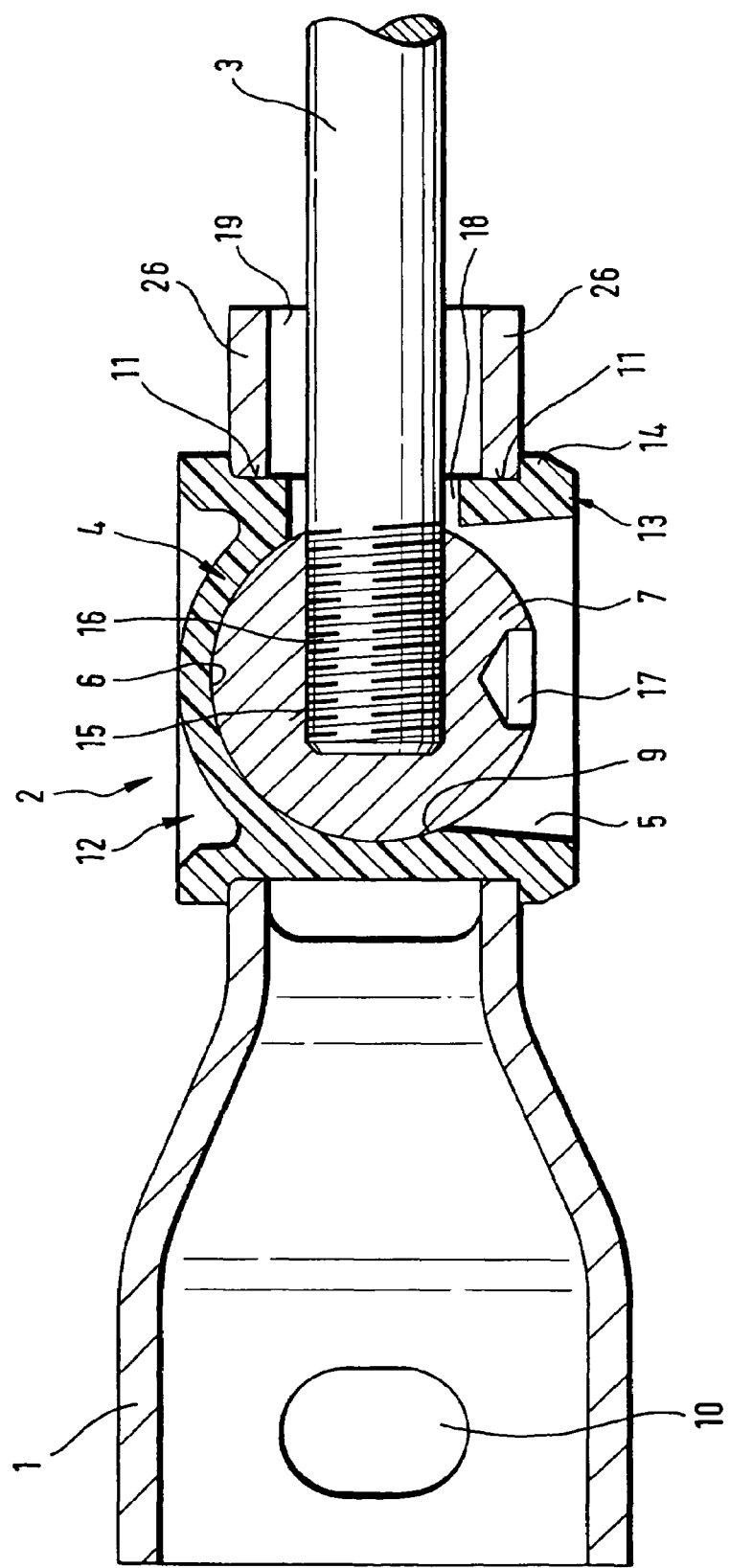
FIG. 1 shows a cross section of a side view of a first exemplary embodiment of a ball-and-socket joint connection according to the present invention.

The ball-and-socket joint connections illustrated in the figures have a retaining part 1, 1', 1", 1''', 1'''', 1''''' which can be arranged fixedly on a component (not illustrated) of a motor vehicle, such as the body or a door. A piston rod 3 of a piston/cylinder unit (not illustrated specifically) of a door arrester is connected to the retaining part 1, 1', 1", 1''', 1'''', 1''''' via a ball-and-socket joint 2.

The ball-and-socket joint 2 has a ball socket 4 which has a spherical-cap-shaped recess 6 which forms a ball seat. The ball socket 4 also has a radially directed spherical-cap opening 5 (a radially directed opening for the spherical-cap-shaped recess) communicating with the spherical-cap-shaped recess 6.

A ball-like component, such as a ball 7 or a ball section 8, can be introduced radially into the spherical-cap-shaped recess 6 from the outside through the spherical-cap opening 5. The ball socket 4 extends towards the spherical-cap opening 5 beyond the central line thereof and, in the process, forms a bearing shoulder 9 which grips the ball-like component from behind and by means of which the ball-like component is retained in the spherical-cap-shaped recess 6.

The ball-like component sits with so much press fit in the spherical-cap-shaped recess 6 that this connection is free from play, but the ball-like component can still be rotated in the spherical-cap-shaped recess 6.

In FIG. 1, the retaining part 1 is designed as a fork piece of U-shaped cross section which has, on its one end region, an elongated hole 10 which forms a fastening point and through which a screw (not illustrated) for screwing onto the body or the door of the motor vehicle can be guided.

Formed on the other end region of the fork piece, transversely to its longitudinal extent, is a continuous recess 11 of round cross section, into which is inserted a locking cage 12 which is formed as a wear-resistant plastic part and has the ball socket 4. The cross-sectional contour of the locking cage 12 corresponds to the cross section of the recess 11 of the fork piece. Starting from the spherical-cap-shaped recess 6, the locking cage 12 has, protruding away freely coaxially to the recess 11, a retaining ring 13 which is of radially resilient design and the opening of which forms the spherical-cap opening 5.

Instead of the retaining ring 13, retaining arms which protrude away freely from the ball socket 4, are moveable in a radially resilient manner and form the spherical-cap opening between them could also be arranged in a manner forming a circle.

At its axial ends, the locking cage 12 has catches 14 which are directed radially outwards, grip behind the mouth regions of the recess 11 and thereby secure the locking cage 12 axially in the recess 11.

In the direction of longitudinal extent of the fork piece and in the plane formed between and parallel to the fork limbs 26 thereof, the ball socket has a radial, slot-like journal opening 18 which is directed towards its centre and through which the free end of the piston rod 3 protrudes into the ball socket 4 and is screwed there to the ball 7. For this purpose, the ball 7 has a radially directed threaded hole 15 into which the piston rod 3, which is provided at its end with a corresponding thread 16, is screwed.

The plane formed between the fork limbs 26 and the plane in which the slot-like journal opening 18 is situated form a pivoting plane of the piston rod 3, and the opening of the longitudinal side of the fork piece forms a journal slot 19 in which the piston rod 3 can be pivoted.

So that the ball 7 does not rotate when the piston rod 3 is being screwed into the threaded hole 15, the ball has a recess 17 which opens radially outwards, is directed approximately coaxially to the spherical-cap opening 5 and into which a tool can be introduced from the outside through the spherical-cap opening 5 and is used to prevent rotation of the ball 7 during the screwing-in of the piston rod 3.

Figure 2:
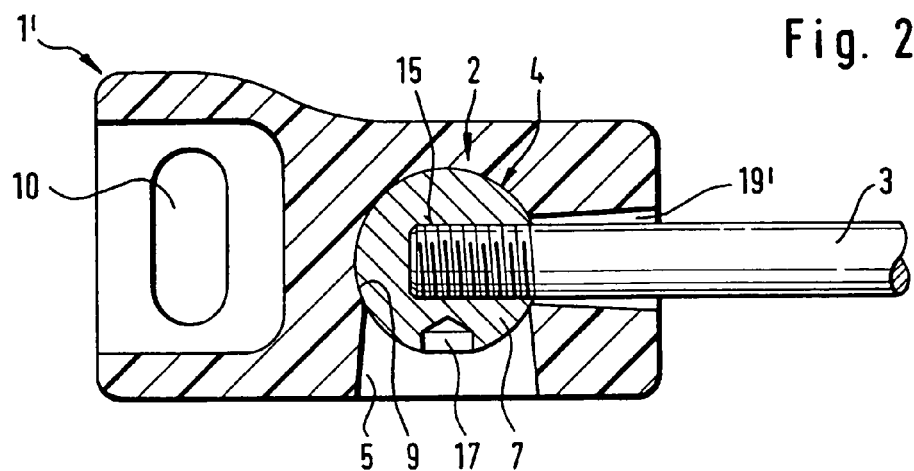
FIG. 2 shows a cross section of a side view of a second exemplary embodiment of a ball-and-socket joint connection according to the present invention.
Figure 3:
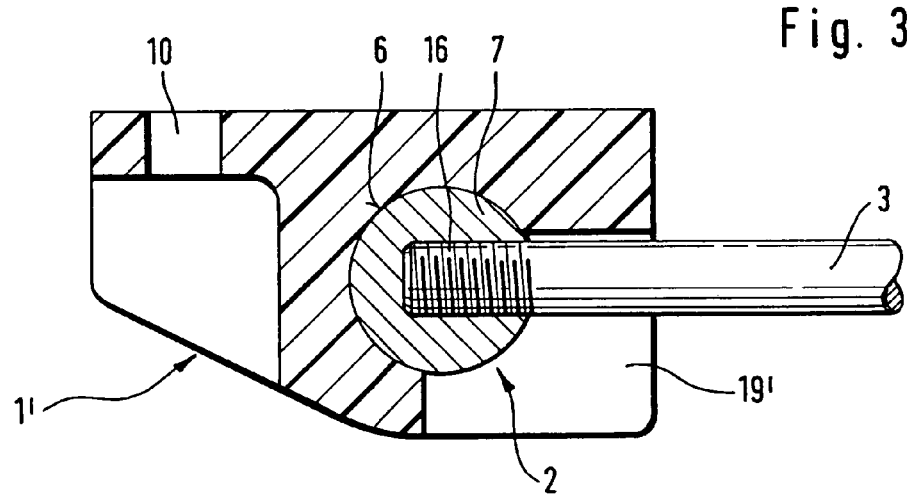
FIG. 3 shows a cross section of a plan view of the ball-and-socket joint connection according to FIG. 2 according to the present invention.
Figure 4:
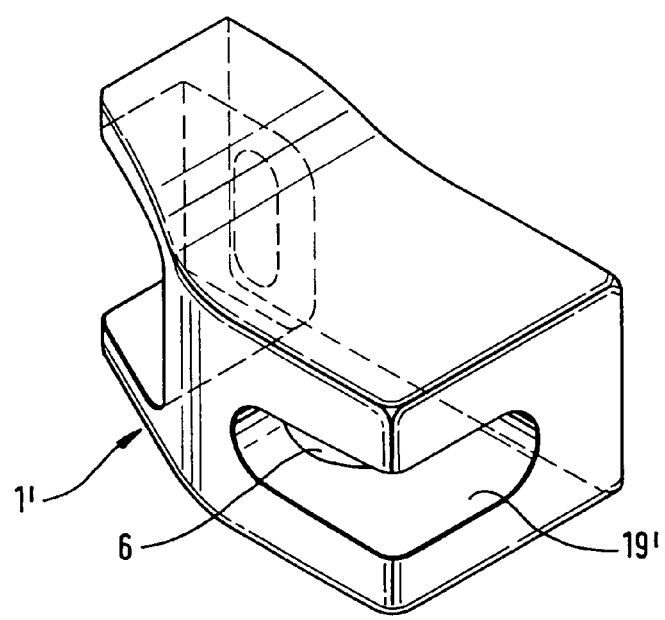
FIG. 4 shows a perspective view of the retaining part of the ball-and-socket joint connection according to FIG. 2 of the present invention.
Figure 8:
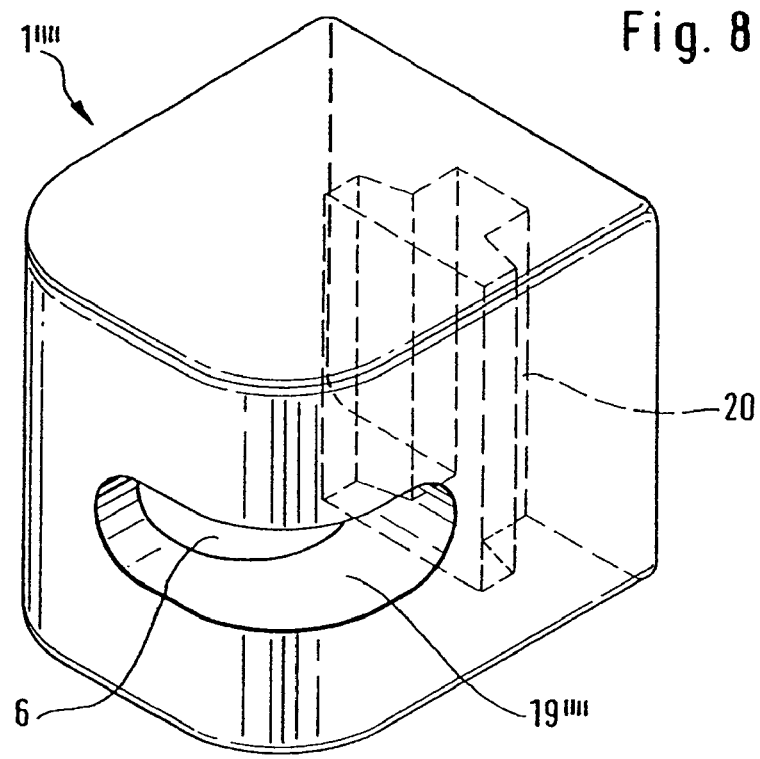
FIG. 8 shows a perspective view of a first exemplary embodiment of the retaining part of the ball-and-socket joint connection according to FIG. 5 of the present invention.

In the case of the exemplary embodiment of FIGS. 2 to 4, the retaining part 1' is formed integrally with the ball socket 4 as a plastic cast part. As in the exemplary embodiment of FIG. 1, the retaining part 1' has an elongated hole 10 on its one end region for fastening it to a body part or a door.

The spherical-cap opening 5 extends from the spherical-cap-shaped recess 11 transversely to the longitudinal extent of the piston rod 3, and the piston rod 3 is guided through a journal slot 19', which extends approximately at right angles to it, in the retaining part 1' into the spherical-cap-shaped recess 11 and, in the same manner as in FIG. 1, is screwed to the ball 7 arranged for this purpose.

The journal slot 19', which is continuous radially to the ball socket 4 and is formed at an angle of approximately 90° to the extent of the spherical-cap opening 5, extends through approximately 90° radially to the ball socket 4. The width of the journal slot 19 is slightly larger than the diameter of the piston rod 3.

Figure 9:
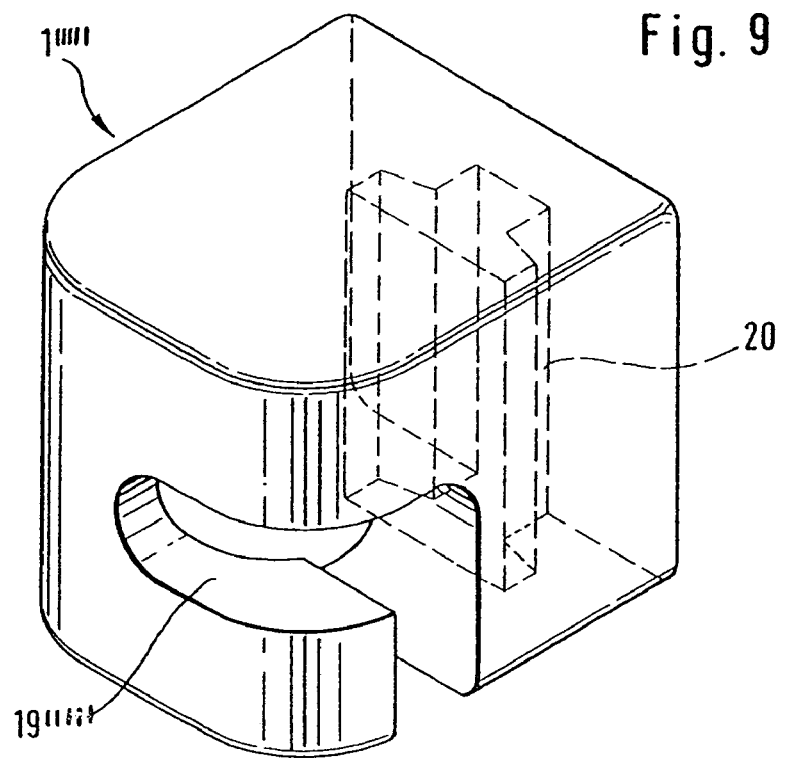
FIG. 9 shows a perspective view of a second exemplary embodiment of the retaining part of the ball-and-socket joint connection according to FIG. 5 of the present invention.

As the exemplary embodiment of FIG. 9 shows, the one end region of the journal slot 19'''' can extend opening outwards approximately axially to the spherical-cap opening 5, so that the ball 7 can be connected to the piston rod 3 even before it is introduced into the ball socket 4.

The exemplary embodiment of FIGS. 5 to 8 differs from the exemplary embodiment of FIGS. 2 to 4 only with regard to the fastening point. The latter is designed as a T-shaped groove 20 which extends transversely to the pivoting plane of the piston rod 3 and into which a clamping wedge of corresponding shape arranged on the body or the door can be introduced and forms a clamping-wedge connection.

The exemplary embodiment of FIG. 9 also has a fastening point of this type.

Figure 10:
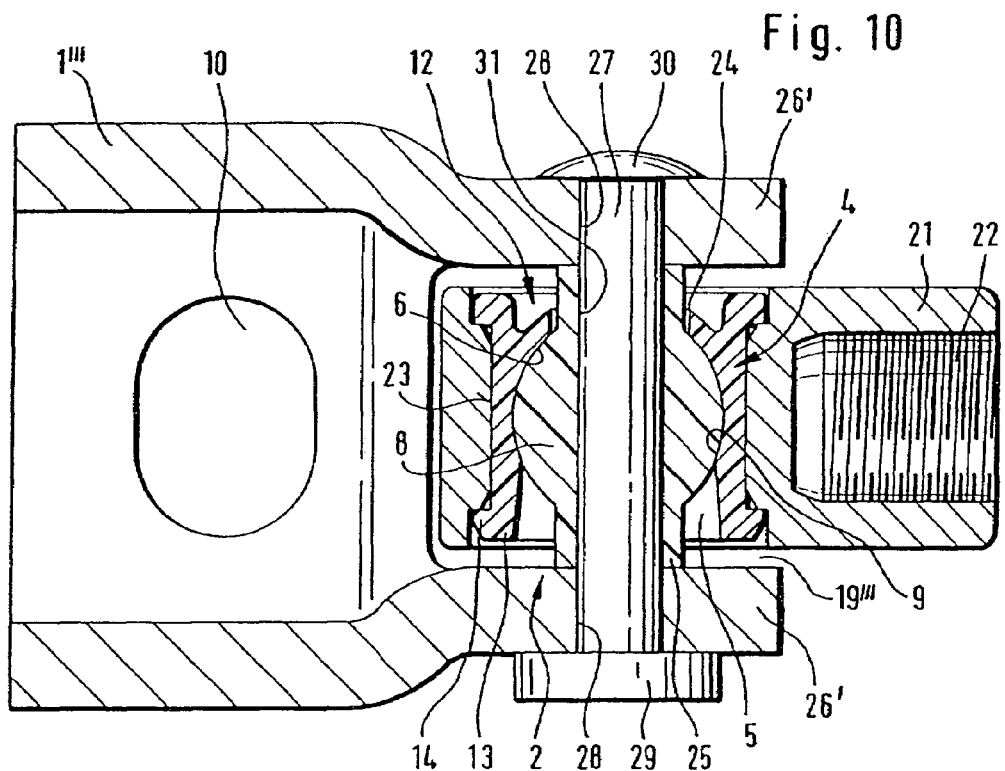
FIG. 10 shows a cross section of a side view of a fourth exemplary embodiment of a ball-and-socket joint connection of the present invention.
Figure 11:
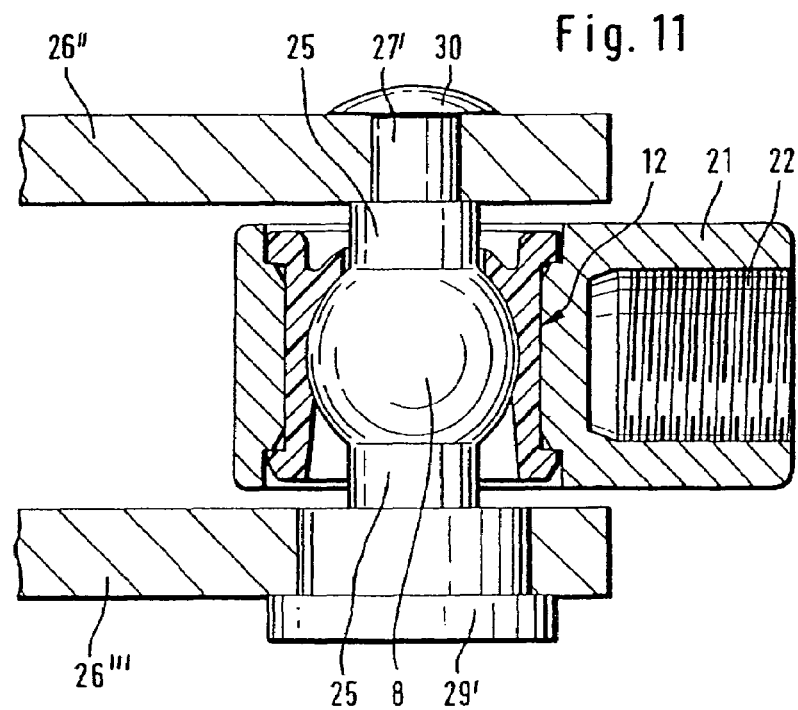
FIG. 11 shows a cross section of a side view of a fifth exemplary embodiment of a ball-and-socket joint connection of the present invention.
Figure 12:
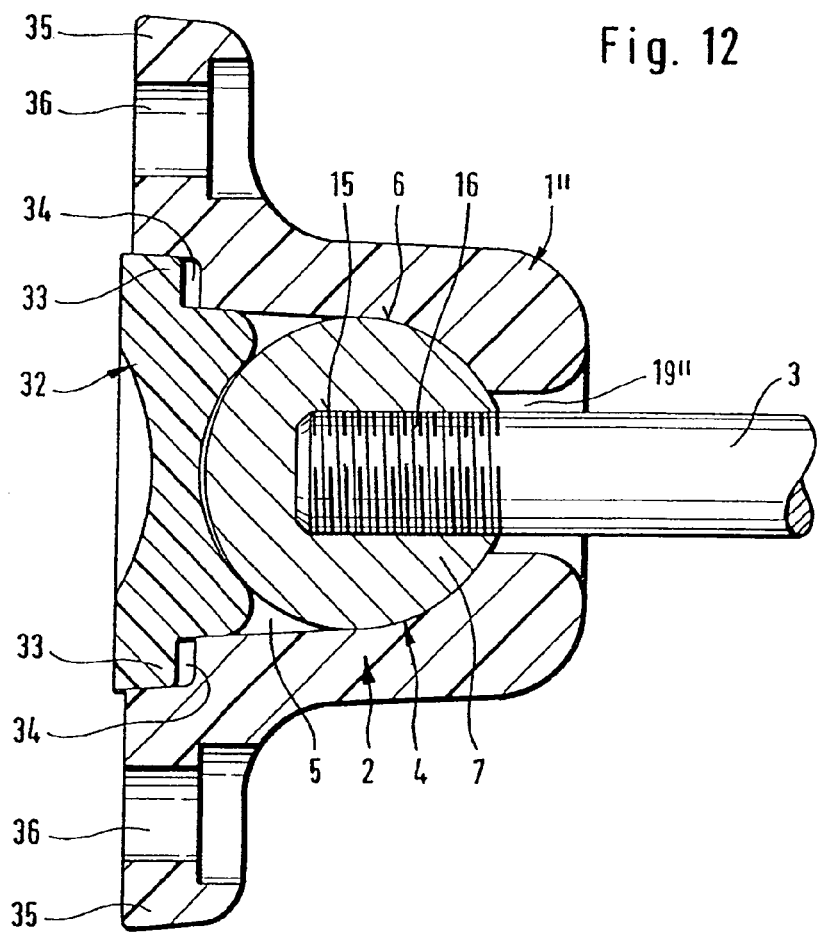
FIG. 12 shows a cross section of a side view of a sixth exemplary embodiment of a ball-and-socket joint connection of the present invention.
Figure 17:
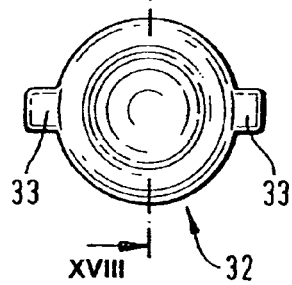
FIG. 17 shows a view of a spherical-cap base of the ball-and-socket joint connection according to FIG. 12 of the present invention.
Figure 18:
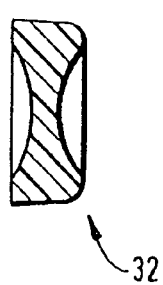
FIG. 18 shows a cross section of the spherical-cap base along line XIV-XIV in FIG. 17 of the present invention.
Figure 19:
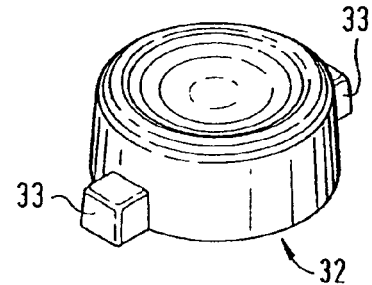
FIG. 19 shows a perspective view of the spherical-cap base according to FIG. 17.

In the case of the exemplary embodiments of FIGS. 10 and 11, the ball socket 4 is arranged on a ball-socket holder 21 which is connected coaxially to the free end of the piston rod 3 by means of a screw connection. This free end of the piston rod 3 here is provided with a thread 16 which is screwed in a corresponding threaded hole 22 of the ball-socket holder 21.

The construction of the retaining part 1 corresponds to the fork piece of the exemplary embodiment of FIG. 1.

As in the exemplary embodiment of FIG. 1, the ball socket 4 has a locking cage 12 which is inserted into a continuous recess 23 of the ball-socket holder 21 and is secured by catches 14. In this case, the recess 23 extends approximately at right angles to the pivoting plane of the piston rod.

Coaxial to the spherical-cap opening 5, a passage opening 24 is formed in the ball socket 4 lying opposite the spherical-cap opening 5. The ball section 8 is mounted pivotably in the ball socket 4 and has spacer journals 25 coaxially on both sides which protrude through the spherical-cap opening 5 and the passage opening 24 and with their end sides are in contact with the inner sides of the fork limbs 26 of the fork piece. As a result, the ball-socket holder 21 is always retained centrally between the fork limbs 26. Coaxially to the spacer journals 25, the ball section 8 has an axle 27 protruding on both sides and, protruding through corresponding holes 28 in the fork limbs 26, is fastened thereon. For this purpose, the axle 27 has, at its one end, a radially expanding head 29 which bears against the outer side of the one fork limb 26 while the other end of the axle 27 is radially extended to form a rivet head 30 bearing against the outer side of the other fork limb 26.

In FIG. 10, the axle 27 is an axle journal which protrudes through a corresponding hole 31 of the ball section 8 while, in FIG. 11, the ends of the axle 27' are formed integrally with the ball section 8.

In the exemplary embodiment of FIGS. 12 to 19, the retaining part 1" is a plastic part and also integrally has the ball socket 4.

The spherical-cap opening 5 opens into the spherical-cap-shaped recess 11 in a manner opposed to the journal slot 19".

The piston rod 3 which protrudes through the journal slot 19" is provided with a thread 16 at its free end and is screwed in a corresponding threaded hole 15 of the ball 7.

The mouth region of the spherical-cap opening 5 is closed by a spherical-cap base 32 which is of spherical-cap-shaped design corresponding to the ball 7 on the side facing the latter. The ball 7 is in contact with this spherical-cap-shaped contour of the spherical-cap base 32.

Lying diametrically opposite each other, two guide journals 33 protrude radially from the circular spherical-cap base 32 and, in corresponding recesses 34 in the retaining part 1", form a means of securing the spherical-cap base 32 against rotation.

At the end having the mouth of the spherical-cap opening 5, the retaining part 1" has radially extending tabs 35 which are provided with recesses 36 which are directed axially to the direction of longitudinal extent of the piston rod 3 and form fastening points for fastening it to the body or the door by means of screws.

The journal slot 19" is formed in accordance with the journal slot 19' of FIGS. 2 to 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pivoting ball-and-socket joint connection for mounting to a structure, comprising:
    a retaining part having a fastening point for fixedly mounting the retaining part to the structure, the retaining part also having a journal slot therein;
    a ball-and-socket joint connected to the retaining part and comprising:
        a ball-shaped component; and
        a ball socket having a spherical-cap-shaped recess located therein for rotatably receiving the ball shaped component, a radially directed first opening for introducing the ball-shaped component into the spherical-cap-shaped recess, and a bearing shoulder for retaining the ball-shaped component in the spherical-cap-shaped recess; and
    a rod part protruding from the ball-shaped component and out of the journal slot so that the rod part is pivotable relative to the ball socket in a pivoting plane along the journal slot,
    wherein the journal slot and the first opening are separate and configured so that the rod part is prevented from reaching the first opening when pivoting relative to the ball socket in the pivoting plane along the journal slot,
    wherein the fastening point and the ball-and-socket joint are situated approximately in the pivoting plane of the rod part so that a force flux of a force to be transmitted by the ball-and-socket joint connection is directed largely toward the pivoting plane to reduce a bending moment and loading on the retaining part,
    wherein the first opening extends non-parallel and non-coplanar to the pivoting plane of the rod part, and
    wherein the ball-shaped component has a recess which opens radially outwards and extends approximately coaxially to the first opening.

2. The pivoting ball-and-socket joint connection of claim 1, wherein the first opening has a longitudinal axis extending approximately normal to the pivoting plane of the journal slot.

3. The pivoting ball-and-socket joint connection of claim 1, wherein the rod part comprises a piston rod of a piston/cylinder unit.

4. The pivoting ball-and-socket joint connection of claim 1, wherein the first opening extends substantially perpendicular to the pivoting plane of the rod part.

5. A pivoting ball-and-socket joint connection for mounting to a structure, comprising:
    a retaining part having a fastening point for fixedly mounting the retaining part to the structure, the retaining part also having a journal slot therein;
    a ball-and-socket joint connected to the retaining part and comprising:
        a ball-shaped component; and
        a ball socket having a spherical-cap-shaped recess located therein for rotatably receiving the ball shaped component, a radially directed first opening for introducing the ball-shaped component into the spherical-cap-shaped recess, and a bearing shoulder for retaining the ball-shaped component in the spherical-cap-shaped recess; and
    a rod part protruding from the ball-shaped component and out of the journal slot so that the rod part is pivotable relative to the ball socket in a pivoting plane along the journal slot, the rod part extending radially from the ball-shaped component and having a threaded end,
    wherein the ball-shaped component has a radially directed threaded hole into which the rod part is screwed,
    wherein the journal slot and the first opening are separate and configured so that the rod part is prevented from reaching the first opening when pivoting relative to the ball socket in the pivoting plane along the journal slot,
    wherein the fastening point and the ball-and-socket joint are situated approximately in the pivoting plane of the rod part so that a force flux of a force to be transmitted by the ball-and-socket joint connection is directed largely toward the pivoting plane to reduce a bending moment and loading on the retaining part, and
    wherein the first opening extends non-parallel and non-coplanar to the pivoting plane of the rod part.

6. A pivoting ball-and-socket joint connection for mounting to a structure, comprising:
    a retaining part having a fastening point for fixedly mounting the retaining part to the structure, the retaining part also having a journal slot therein;
    a ball-and-socket joint connected to the retaining part and comprising:
        a ball-shaped component; and
        a ball socket having a spherical-cap-shaped recess located therein for rotatably receiving the ball shaped component, a radially directed first opening for introducing the ball-shaped component into the spherical-cap-shaped recess, and a bearing shoulder for retaining the ball-shaped component in the spherical-cap-shaped recess; and
    a rod part protruding from the ball-shaped component and out of the journal slot so that the rod part is pivotable relative to the ball socket in a pivoting plane along the journal slot,
    wherein the journal slot and the first opening are separate and configured so that the rod part is prevented from reaching the first opening when pivoting relative to the ball socket in the pivoting plane along the journal slot,
    wherein the fastening point and the ball-and-socket joint are situated approximately in the pivoting plane of the rod part so that a force flux of a force to be transmitted by the ball-and-socket joint connection is directed largely toward the pivoting plane to reduce a bending moment and loading on the retaining part,
    wherein the first opening extends non-parallel and non-coplanar to the pivoting plane of the rod part, and
    wherein the ball socket comprises a locking cage which is inserted into a recess of the retaining part or a ball-socket holder.

7. The pivoting ball-and-socket joint connection of claim 6, wherein the locking cage has retaining arms which protrude away freely from the ball socket and which are arranged along a circle, the retaining arms being radially moveable and also extendable in the direction of the first opening.

8. The pivoting ball-and-socket joint connection of claim 6, wherein the locking cage has, at at least one end thereof, radially outwardly directed catches which grip behind a mouth region of the recess of the retaining part.

* * * * *